(12) United States Patent
Woo et al.

(10) Patent No.: US 8,144,162 B2
(45) Date of Patent: Mar. 27, 2012

(54) METHOD AND APPARATUS FOR RENDERING THREE DIMENSIONAL GRAPHICS DATA

(75) Inventors: Sang-oak Woo, Anyang-si (KR); Seok-yoon Jung, Seoul (KR); Kwon-taek Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 996 days.

(21) Appl. No.: 11/976,209

(22) Filed: Oct. 22, 2007

(65) Prior Publication Data
US 2009/0002387 A1 Jan. 1, 2009

(30) Foreign Application Priority Data
Jun. 28, 2007 (KR) .................. 10-2007-0064605

(51) Int. Cl.
 *G09G 5/00* (2006.01)
(52) U.S. Cl. ........................................... 345/587
(58) Field of Classification Search .................. 345/587, 345/581, 582
See application file for complete search history.

(56) References Cited

U.S. PATENT DOCUMENTS

| | | | |
|---|---|---|---|
| 5,973,701 A * | 10/1999 | Vaswani | 345/587 |
| 6,154,216 A | 11/2000 | Walton | |
| 6,583,793 B1 | 6/2003 | Gould et al. | |
| 6,975,329 B2 | 12/2005 | Bastos et al. | |
| 2005/0057571 A1* | 3/2005 | Stevens | 345/501 |

FOREIGN PATENT DOCUMENTS

| | | |
|---|---|---|
| JP | 7-230555 | 8/1995 |
| JP | 10-75445 | 3/1998 |
| JP | 11-250280 | 9/1999 |
| JP | 2002-358537 | 12/2002 |
| JP | 2005-235029 | 9/2005 |
| KR | 10-2006-0105337 | 10/2006 |

OTHER PUBLICATIONS

Patent Abstracts of Japan, Publication No. 07-230555, Published Aug. 29, 1995.
Patent Abstracts of Japan, Publication No. 2005-235029, Published Sep. 2, 2005.
Patent Abstracts of Japan, Publication No. 2002-358537, Published Dec. 13, 2002.
Patent Abstracts of Japan, Publication No. 11-250280, Published Sep. 17, 1999.
Patent Abstracts of Japan, Publication No. 10-075445, Published Mar. 17, 1998.

* cited by examiner

*Primary Examiner* — Ryan R Yang
(74) *Attorney, Agent, or Firm* — Staas & Halsey LLP

(57) ABSTRACT

Provided is a method and apparatus for rendering 3D graphics data. By calculating the size of a primitive, which is a basic constituent unit of objects indicated by the graphics data, on a screen, selecting one of a plurality of resolutions supported by a video stream according to the calculated size, generating a video frame image having the selected resolution from the video stream, and rendering the graphics data using the generated video frame image, the amount of memory space used and power consumed are reduced. In addition, since when rendering is performed using a video frame image decoded at a low resolution, a processing speed increases, and since rendering can be performed using video frame images decoded at various resolutions, image quality increases.

11 Claims, 12 Drawing Sheets

METHOD AND APPARATUS FOR RENDERING THREE DIMENSIONAL GRAPHICS DATA

CROSS-REFERENCE TO RELATED PATENT APPLICATION

This application claims the benefit of Korean Patent Application No. 10-2007-0064605, filed on Jun. 28, 2007, in the Korean Intellectual Property Office, the disclosure of which is incorporated herein in its entirety by reference.

BACKGROUND OF THE INVENTION

1. Field of the Invention

The present invention relates to a method and apparatus for rendering three dimensional (3D) graphics data, and more particularly, to a method and apparatus for rendering 3D graphics data by using a video frame image generated from a video stream.

2. Description of the Related Art

Along with the appearance of Portable Multimedia Players (PMPs), support of mobile viewing, and cellular phones supporting Digital Multimedia Broadcasting (DMB) and Digital Video Broadcasting-Handheld (DVB-H), hardware processing three dimensional (3D) graphics data and a video decoder have been being developed as a single System On Chip (SOC). As a result, the need to effectively use a video stream as a texture source of 3D graphics data is increasing. Texture means an image pattern of colors to be applied to the surface of a 3D object.

There is a method of using a mipmap in order to generate textures to be used on 3D graphics data. Mipmap is a set of textures, each texture having a gradually lower resolution for the same image. If height and width of each texture is expressed by a mipmap level, an image of a certain mipmap level is less, by a power of 2 in terms of height and width, than an image of a previous mipmap level. For example, if it is assumed that the size of a mipmap level 0 is 1, the size of a mipmap level 1 is a ¼ of the size of the mipmap level 0, and the size of a mipmap level 2 is a ¼ of the size of the mipmap level 1. In this manner, a mipmap is produced by continuously decreasing each size by a ½. Mipmapping is performed in order to pre-generate mipmap level images having various sizes and perform texture mapping using an image of a mipmap level having the closest size to 3D graphics data.

A mipmap is most frequently used among anti-aliasing schemes for textures. Since all pictures are composed of pixels in output devices of a raster method, each boundary of slant lines or pictures is not shown smoothly due to "jaggies" or aliasing, and if resolution of output devices is low, the "jaggies" or aliasing is clearer. A scheme of smoothly showing these lines and/or boundaries is called anti-aliasing. By using a mipmap, a series of textures smaller than an original texture prior to rendering is generated. Smaller textures are ¼ the size of a previous texture and are repeatedly generated until the size of a texture becomes 1. A mipmap corresponding to the size of a texture is needed for rendering. Thus, in order to generate a texture to be used for 3D graphics data, a mipmap is generated from a texture immediately before rendering, or textures of all mipmap levels must be previously generated when the texture is generated. An example of the latter is a Direct Draw Surface (DDS) file format.

Two cases where a video stream is used as a texture source for 3D graphics data may exist. The first one is a case where it can be known before the video stream is used as a texture. In this case, a method of using the video stream as a texture is as follows. A video decoder generates a video frame image by decoding the video stream, generates a mipmap of the generated video frame image, and stores the generated mipmap in memory. A 3D pipeline converting 3D graphics data to a 2D raster image calculates a mipmap level of a 3D graphics primitive which is a basic constituent unit of objects indicated by 3D graphics data, selects a mipmap closest to the calculated mipmap level from among mipmaps stored in the memory, and performs texture filtering using the selected mipmap.

The texture filtering is a method of determining color information of each of pixels of 3D graphics data from texels. However, the 3D graphics data rendering method described above has a problem in that video frame images corresponding to all mipmap levels are previously generated and used with finally using only a video frame image corresponding to a single mipmap level when a 3D object is rendered. There is another problem in that when mipmap data corresponding to all video frame images of a video stream is previously generated and used as textures, much storage space is needed to store the mipmap data.

The second case where a video stream is used as a texture source for 3D graphics data is a case where it cannot be known before the video stream is used as a texture. An example is a case where a bitstream is transmitted in real-time, as in Moving Picture Experts Group (MPEG) or DMB. In this case, since a video stream is transmitted in real-time, there is not sufficient time to generate mipmap data before a video frame image generated from the video stream is used as a texture and to use one of the generated mipmap data as a texture.

SUMMARY OF THE INVENTION

The present invention provides a method and apparatus for rendering three dimensional (3D) graphics data to reduce a memory space for storing mipmap data and increase a rendering speed by selecting necessary mipmap data or a resolution of a video frame image before the video frame image is generated so as not to generate unnecessary mipmap data when the video frame image is generated from a video stream.

The present invention also provides a computer readable recording medium storing a computer readable program for executing the method.

According to an aspect of the present invention, there is provided a method of rendering three dimensional (3D) graphics data, the method comprising: calculating a size of a primitive, which is a basic constituent unit of objects indicated by the graphics data, on a screen; selecting one of a plurality of resolutions supported by a video stream according to the calculated size; generating a video frame image having the selected resolution from the video stream; and rendering the graphics data using the generated video frame image.

According to another aspect of the present invention, there is provided a method of rendering three dimensional (3D) graphics data, the method comprising: generating a video frame image having a single resolution from a video stream; calculating a mipmap level corresponding to a size of a primitive, which is a basic constituent unit of objects indicated by the graphics data; generating an image corresponding to the mipmap level from the video frame image; and rendering the graphics data using the generated image.

According to another aspect of the present invention, there is provided a method of rendering three dimensional (3D) graphics data, the method comprising: selecting a pixel having a greatest depth value and a pixel having a least depth value from among pixels of a primitive, which is a basic constituent unit of objects indicated by the graphics data; selecting resolutions corresponding to depth values of the selected pixels from among a plurality of resolutions supported by a video stream; generating video frame images having the selected resolutions and resolutions between the selected resolutions from the video stream; and rendering the graphics data using the generated video frame images.

According to another aspect of the present invention, there is provided a method of rendering three dimensional (3D) graphics data, the method comprising: generating a video frame image having a single resolution from a video stream; selecting a pixel having a greatest depth value and a pixel having a least depth value from among pixels of a primitive, which is a basic constituent unit of objects indicated by the graphics data; calculating mipmap levels corresponding to depth values of the selected pixels; forming images corresponding to the calculated mipmap levels and mipmap levels between the calculated mipmap levels from the video frame image; and rendering the graphics data using the generated images.

According to another aspect of the present invention, there is provided a computer readable recording medium storing a computer readable program for executing a method of rendering three dimensional (3D) graphics data.

Since the maximum resolution of a video frame image decoded from a video stream may not be needed when the video stream is used as textures on 3D graphics data, or since mipmap data of all mipmap levels may not be needed when rendering is performed using a mipmap, the present invention provides a configuration for generating a video frame image of a necessary resolution or mipmap data of a necessary mipmap level.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining preferred embodiments of the invention with reference to the attached drawings.

Figure 1:
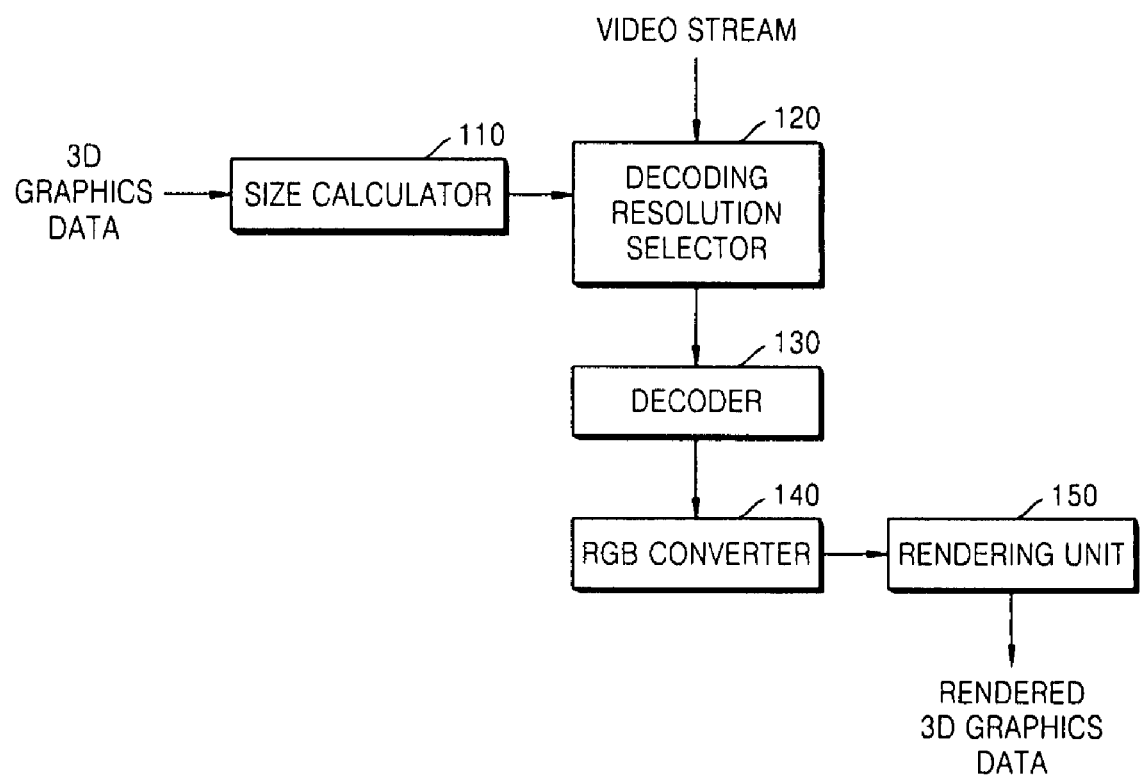
FIG. 1 is a block diagram of an apparatus for rendering three dimensional (3D) graphics data according to a first embodiment of the present invention.

FIG. 1 is a block diagram of an apparatus for rendering three dimensional (3D) graphics data according to a first embodiment of the present invention.

Referring to FIG. 1, the apparatus includes a size calculator 110, a decoding resolution selector 120, a decoder 130, an RGB converter 140, and a rendering unit 150.

The size calculator 110 calculates the size of a primitive, which is a basic constituent unit of objects indicated by 3D graphics data, on a screen. A primitive is a basic constituent unit of objects indicated by 3D graphics data and may be a dot, a line, or a polygon. In general, a triangle-shaped primitive is used. The size calculator 110 calculates the size of a primitive when a video decoder for outputting an image having a plurality of resolutions is used. For example, a video decoder, which uses a Scalable Video Coding (SVC) method of outputting an image at various resolutions by selectively decoding only a portion of a video stream, can be used. The size may be an area of the primitive.

The decoding resolution selector 120 selects one of a plurality of resolutions supported by a video stream according to the size calculated by the size calculator 110. In more detail, the decoding resolution selector 120 selects a relatively high resolution for an object located close to a viewpoint and selects a relatively low resolution for an object located far from the viewpoint. The decoding resolution selector 120 can select one of the plurality of resolutions, which can be made from the video stream, by receiving the video stream and analyzing the received video stream. The decoding resolution selector 120 selects a resolution corresponding to a video frame image having a size closest to the calculated size from among the plurality of resolutions supported by the video stream.

The decoder 130 generates a video frame image having the resolution selected by the decoding resolution selector 120 from the video stream.

The RGB converter 140 converts the video frame image generated by the decoder 130 to an RGB signal value. Since images, such as video or photographs, are generally encoded in a YUV color space, the images encoded in the YUV color space are converted to an RGB signal value.

The rendering unit 150 renders the 3D graphics data using the video frame image received from the RGB converter 140. The rendering includes texture filtering. The texture filtering is a method of determining color information of each of pixels of 3D graphics data from texels.

Figure 2:
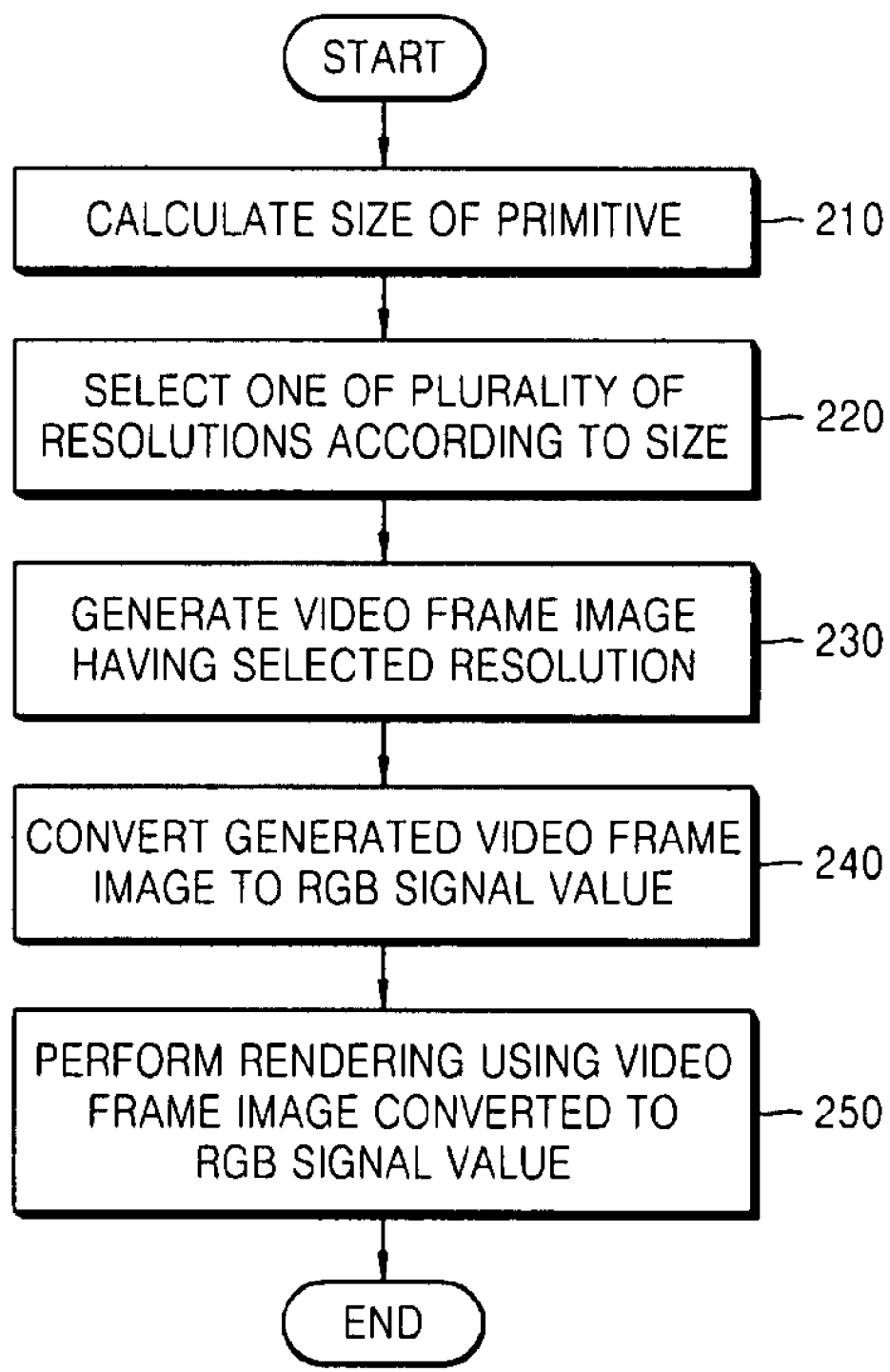
FIG. 2 is a flowchart of a method of rendering 3D graphics data according to the first embodiment of the present invention.

FIG. 2 is a flowchart of a method of rendering 3D graphics data according to the first embodiment of the present invention. The first embodiment corresponds to a case where a video decoder for outputting an image having several resolutions from a received video stream is used. Referring to FIG. 2, the method according to the first embodiment is comprised of operations sequentially processed in the apparatus illustrated in FIG. 1. Thus, even if there exists a description omitted hereinafter, the description of the apparatus illustrated in FIG. 1 is also applied to the method illustrated in FIG. 2.

In operation 210, the apparatus for rendering 3D graphics data calculates the size of a primitive, which is a basic constituent unit of objects indicated by 3D graphics data, on a screen. The size may be an area of the primitive.

In operation 220, the apparatus for rendering 3D graphics data selects one of a plurality of resolutions supported by a video stream according to the size calculated in operation 210. In more detail, the apparatus for rendering 3D graphics data selects a relatively high resolution for an object located close to a viewpoint and selects a relatively low resolution for an object located far from the viewpoint. The apparatus for rendering 3D graphics data selects a resolution corresponding to a video frame image having a size closest to the size calculated in operation 210 from among the plurality of resolutions supported by the video stream.

In operation 230, the apparatus for rendering 3D graphics data generates a video frame image having the resolution selected in operation 220 from the video stream.

In operation 240, the apparatus for rendering 3D graphics data converts the video frame image generated in operation 230 to an RGB signal value. Since images, such as video or photographs, are generally encoded in a YUV color space, the images encoded in the YUV color space are converted to an RGB signal value.

In operation 250, the apparatus for rendering 3D graphics data renders the 3D graphics data using the video frame image converted in operation 240. The rendering includes texture filtering.

Figure 3:
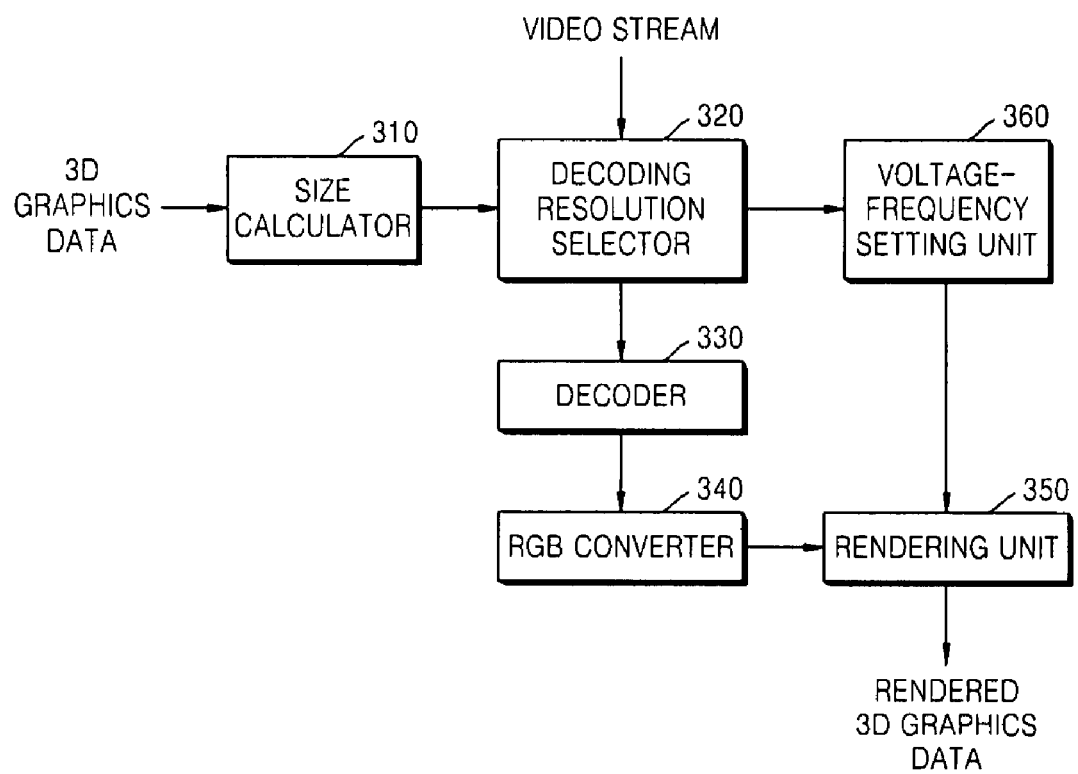
FIG. 3 is a block diagram of an apparatus for rendering 3D graphics data according to a second embodiment of the present invention.

FIG. 3 is a block diagram of an apparatus for rendering 3D graphics data according to a second embodiment of the present invention.

Referring to FIG. 3, the apparatus includes a size calculator 310, a decoding resolution selector 320, a decoder 330, an RGB converter 340, a rendering unit 350, and a voltage-frequency setting unit 360. Descriptions of components also included in the apparatus illustrated in FIG. 1 will be simplified. The difference from the first embodiment is that the voltage-frequency setting unit 360 is added.

The size calculator 310 calculates the size of a primitive, which is a basic constituent unit of objects indicated by 3D graphics data, on a screen.

The decoding resolution selector 320 selects one of a plurality of resolutions supported by a video stream according to the size calculated by the size calculator 310.

The decoder 330 generates a video frame image having the resolution selected by the decoding resolution selector 320 from the video stream.

The RGB converter 340 converts the video frame image generated by the decoder 130 to an RGB signal value.

The rendering unit 350 renders the 3D graphics data using the video frame image received from the RGB converter 340.according to an operating voltage and an operating frequency set by the voltage-frequency setting unit 360.

The voltage-frequency setting unit 360 sets the operating voltage and the operating frequency for rendering the 3D graphics data in proportion to the resolution selected by the decoding resolution selector 320. In this case, by regulating a voltage by using the Dynamic Voltage Scaling (DVS) scheme disclosed in Korean Patent Application No. 2006-105337 titled "method and apparatus for rendering graphics data to minimize power consumption" that is invented by the applicant, power actually consumed to perform rendering can be minimized. The DVS scheme is a scheme used to decrease power consumption in low-power hardware design and is a scheme of decreasing total power consumption by lowering a supplied power and an operating frequency when an idle time occurs due to certain work being processed more quickly than a standard speed. This is caused by the fact that dynamic power consumption of a semiconductor circuit decreases as a supplied voltage or a threshold voltage is lowered. Since a propagation delay for processing predetermined work increases when a supplied voltage decreases, hardware can stably operate only if an operating frequency decreases as well as the supplied voltage. Thus, the operating frequency is also decreased as the supplied voltage decreases. Accordingly, the voltage-frequency setting unit 360 sets a higher operating voltage and a higher operating frequency as the resolution selected by the decoding resolution selector 320 becomes higher.

Figure 4:
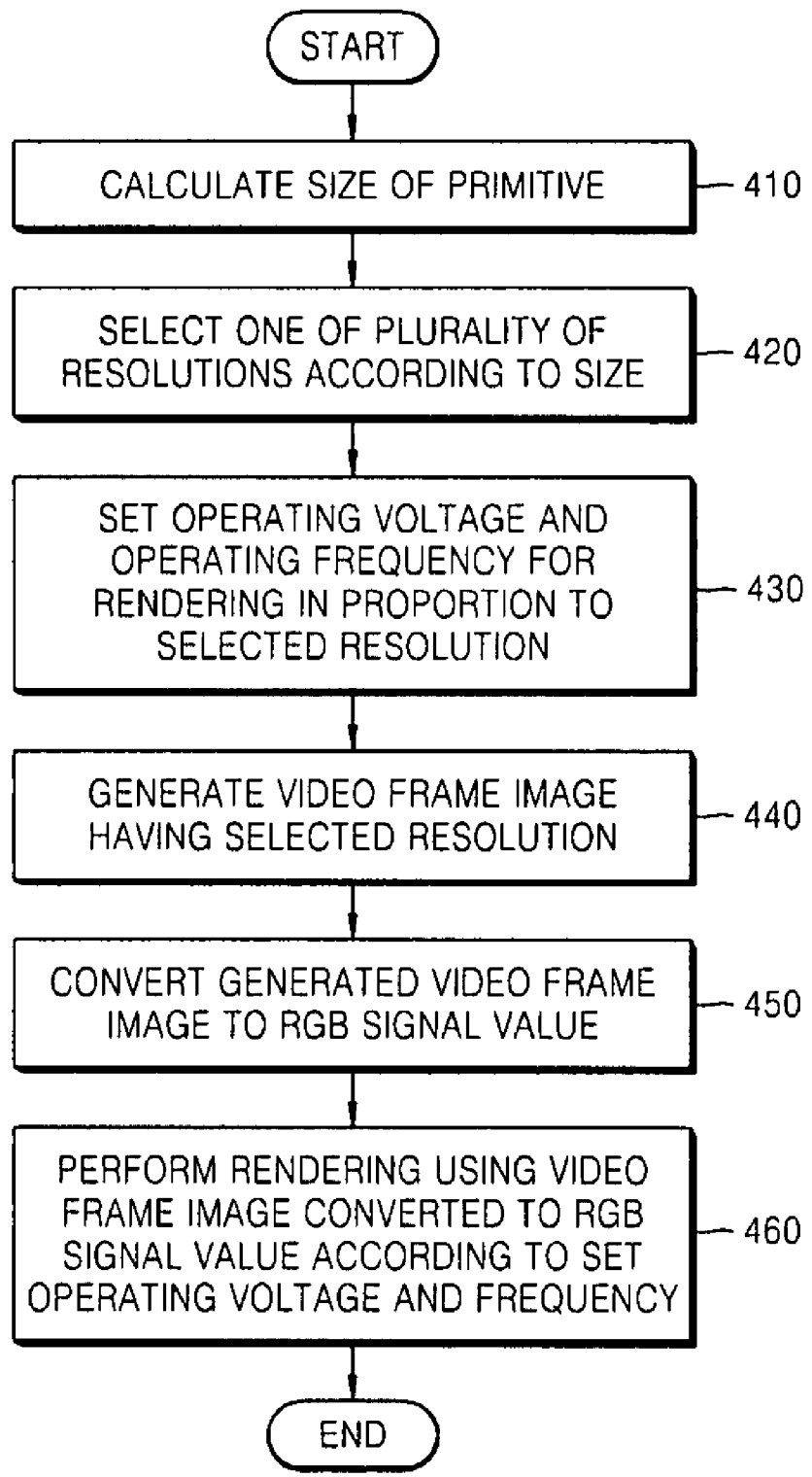
FIG. 4 is a flowchart of a method of rendering 3D graphics data according to the second embodiment of the present invention.

FIG. 4 is a flowchart of a method of rendering 3D graphics data according to the second embodiment of the present invention. The second embodiment corresponds to a case where a video decoder for outputting an image having several resolutions from a received video stream is used. Referring to FIG. 4, the method according to the second embodiment is comprised of operations sequentially processed in the apparatus illustrated in FIG. 3. Thus, even if there exist descriptions omitted hereinafter, the description of the apparatus illustrated in FIG. 3 is also applied to the method illustrated in FIG. 4. When the second embodiment illustrated in FIG. 4 is compared to the first embodiment illustrated in FIG. 2, since operation 430 is further added, differences will be described in more detail while similar portions will be simply described.

In operation 410, the apparatus for rendering 3D graphics data calculates the size of a primitive, which is a basic constituent unit of objects indicated by 3D graphics data, on a screen.

In operation 420, the apparatus for rendering 3D graphics data selects one of a plurality of resolutions supported by a video stream according to the size calculated in operation 410.

In operation 430, the apparatus for rendering 3D graphics data sets an operating voltage and an operating frequency for rendering the 3D graphics data in proportion to the resolution selected in operation 420. Thus the apparatus for rendering 3D graphics data sets a higher operating voltage and a higher operating frequency as the resolution selected in operation 420 becomes higher.

In operation 440, the apparatus for rendering 3D graphics data generates a video frame image having the resolution selected in operation 430 from the video stream.

In operation 450, the apparatus for rendering 3D graphics data converts the video frame image generated in operation 440 to an RGB signal value.

In operation 460, the apparatus for rendering 3D graphics data renders the 3D graphics data using the video frame image converted in operation 450 according to the operating voltage and the operating frequency set in operation 430.

Figure 5:
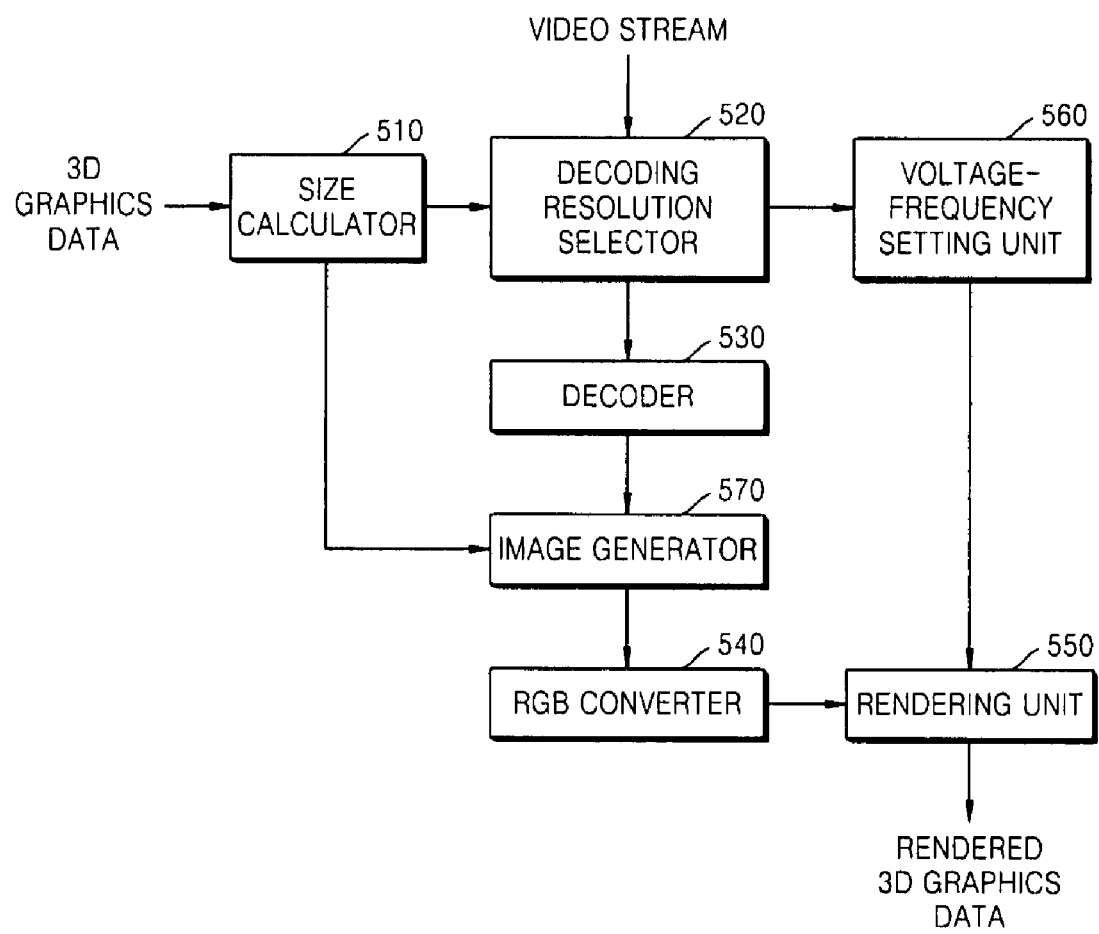
FIG. 5 is a block diagram of an apparatus for rendering 3D graphics data according to a third embodiment of the present invention.

FIG. 5 is a block diagram of an apparatus for rendering 3D graphics data according to a third embodiment of the present invention.

Referring to FIG. 5, the apparatus includes a size calculator 510, a decoding resolution selector 520, a decoder 530, an RGB converter 540, a rendering unit 550, a voltage/frequency setting unit 560, and an image generator 570. Comparing the third embodiment illustrated in FIG. 5 to the second embodiment illustrated in FIG. 3, the difference is the existence of the image generator 570. Thus, duplicated descriptions will be omitted, and the difference will be described in more detail.

When a plurality of primitives use the same image as a texture, the size calculator 510 calculates the maximum size from among sizes of the primitives and mipmap levels corresponding to the sizes. The size calculator 510 outputs the calculated maximum size to the decoding resolution selector 520 and outputs the calculated mipmap levels to the image generator 570. The mipmap level is a level corresponding to the size of a texture. For example, if the length of each of the width and the height decreases by ½, a mipmap level can be one level higher than a previous mipmap level. However, when a mipmap level is set, each of the width and the height does not have to decrease by a ½.

The decoding resolution selector 520 selects one of a plurality of resolutions supported by a video stream according to the maximum size received from the size calculator 510.

The decoder 530 generates a video frame image having the resolution selected by the decoding resolution selector 520 from the video stream.

The image generator 570 generates images corresponding to the mipmap levels calculated by the size calculator 510 from the video frame image generated by the decoder 530. The image generator 570 generates images corresponding to the mipmap levels when a plurality of primitives use the same texture or when a tri-linear filtering method is used.

The RGB converter 540 converts the images generated by the image generator 570 to an RGB signal value.

The rendering unit 550 renders the 3D graphics data using the video frame image received from the RGB converter 540 according to an operating voltage and an operating frequency set by the voltage/frequency setting unit 560. In more detail, the rendering unit 550 prepares a mipmap closest to the size of a primitive, which is a basic constituent unit of objects indicated by 3D graphics data, and determines color information of each of pixels of the primitive by performing a kind of image interpolation for a portion having a size difference.

The voltage/frequency setting unit 560 sets the operating voltage and the operating frequency for rendering the 3D graphics data in proportion to the resolution selected by the decoding resolution selector 520.

Figure 6:
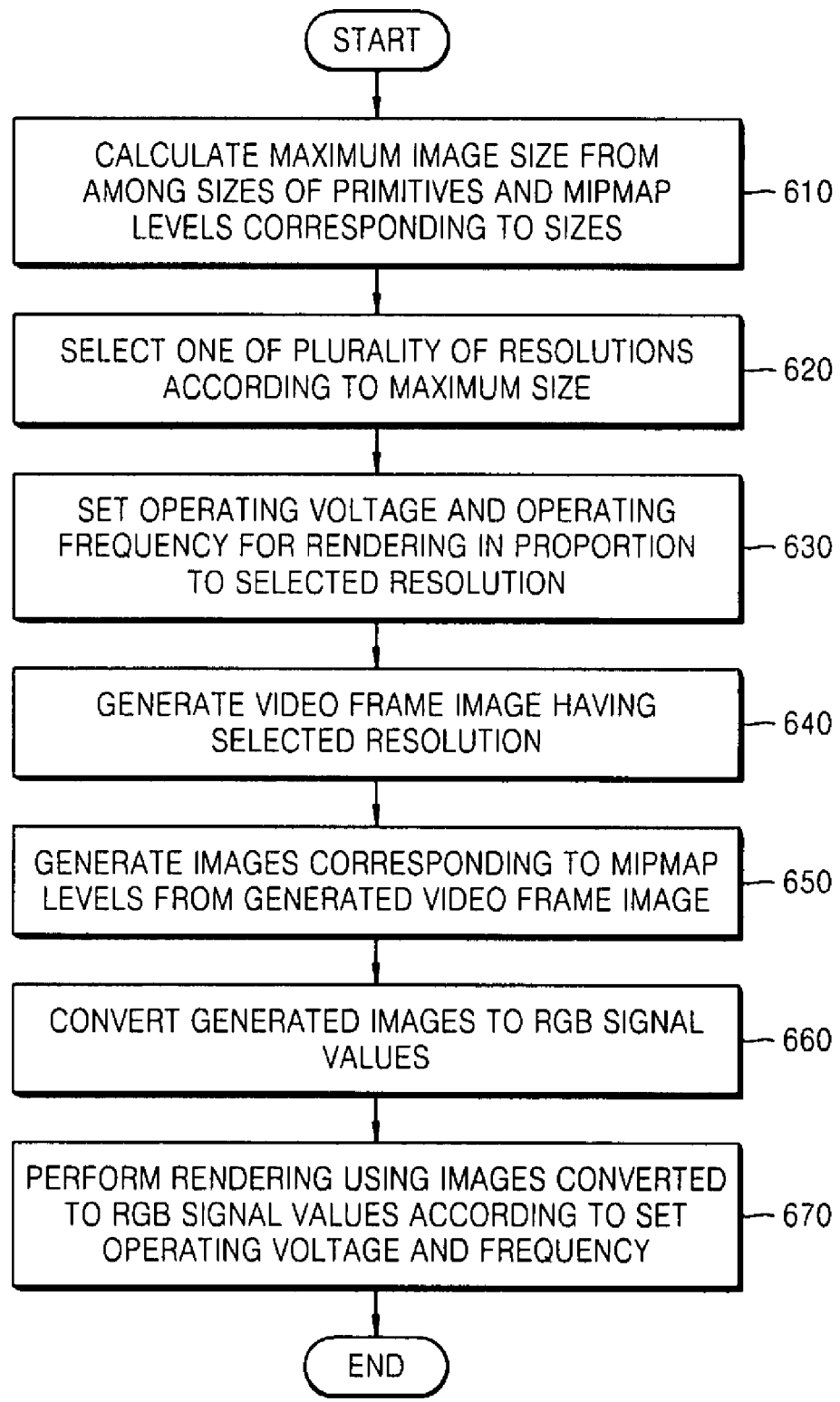
FIG. 6 is a flowchart of a method of rendering 3D graphics data according to the third embodiment of the present invention.

FIG. 6 is a flowchart of a method of rendering 3D graphics data according to the third embodiment of the present invention. Referring to FIG. 6, the method according to the third embodiment is comprised of operations sequentially processed in the apparatus illustrated in FIG. 5. Thus, even if there exist descriptions omitted hereinafter, the description of the apparatus illustrated in FIG. 5 is also applied to the method illustrated in FIG. 4.

The third embodiment corresponds to a case where a video decoder for outputting an image having several resolutions from a received video stream is used. In particular, the third embodiment corresponds to a rendering method of a case where more than two pieces of 3D graphics data share a single texture.

In operation 610, when a plurality of primitives use the same image as a texture, the apparatus for rendering 3D graphics data calculates the maximum size from among sizes of the primitives on a screen. In this case, mipmap levels corresponding to the sizes of the primitives are also calculated.

In operation 620, the apparatus for rendering 3D graphics data selects one of a plurality of resolutions supported by a video stream according to the maximum size calculated in operation 610.

In operation 630, the apparatus for rendering 3D graphics data sets an operating voltage and an operating frequency for rendering the 3D graphics data in proportion to the resolution selected in operation 620.

In operation 640, the apparatus for rendering 3D graphics data generates a video frame image having the resolution selected in operation 620 from the video stream.

In operation 650, the apparatus for rendering 3D graphics data generates images corresponding to the mipmap levels calculated in operation 610 from the video frame image generated in operation 640. In more detail, the apparatus for rendering 3D graphics data can use video frame images corresponding to the mipmap levels calculated in operation 610 when a plurality of 3D graphics primitives use the same texture or when the tri-linear filtering method is used.

A method of determining a color value using the tri-linear filtering method will now be described. It is assumed that an area of a primitive to be texture-mapped is 100 and a size of the primitive is between 120, which is a size of a mipmap level 1, and 80, which is a size of a mipmap level 2. In a bi-linear filtering method, an image is interpolated using only one of the mipmap level 1 and the mipmap level 2 and is then filtered. However, in the tri-linear filtering method, instead of selecting only one mipmap, both the mipmaps having the two levels related to the primitive whose size is 100 are used. That is, by reducing an image of the mipmap level 1 having a relatively large size and magnifying an image of the mipmap level 2 having a relatively small size, the two mipmap levels matches the same size as the primitive to be textured. A new texture is generated by performing interpolation of these adjusted mipmap levels 1 and 2.

In operation 660, the apparatus for rendering 3D graphics data converts the images generated in operation 650 to an RGB signal value.

In operation 670, the apparatus for rendering 3D graphics data renders the 3D graphics data using the images converted in operation 660 according to the operating voltage and the operating frequency set in operation 630. In more detail, the apparatus for rendering 3D graphics data prepares a mipmap closest to the size of a primitive, which is a basic constituent unit of objects indicated by 3D graphics data, and determines color information of each of pixels of the primitive by performing a kind of image interpolation for a portion having a size difference.

Figure 7:
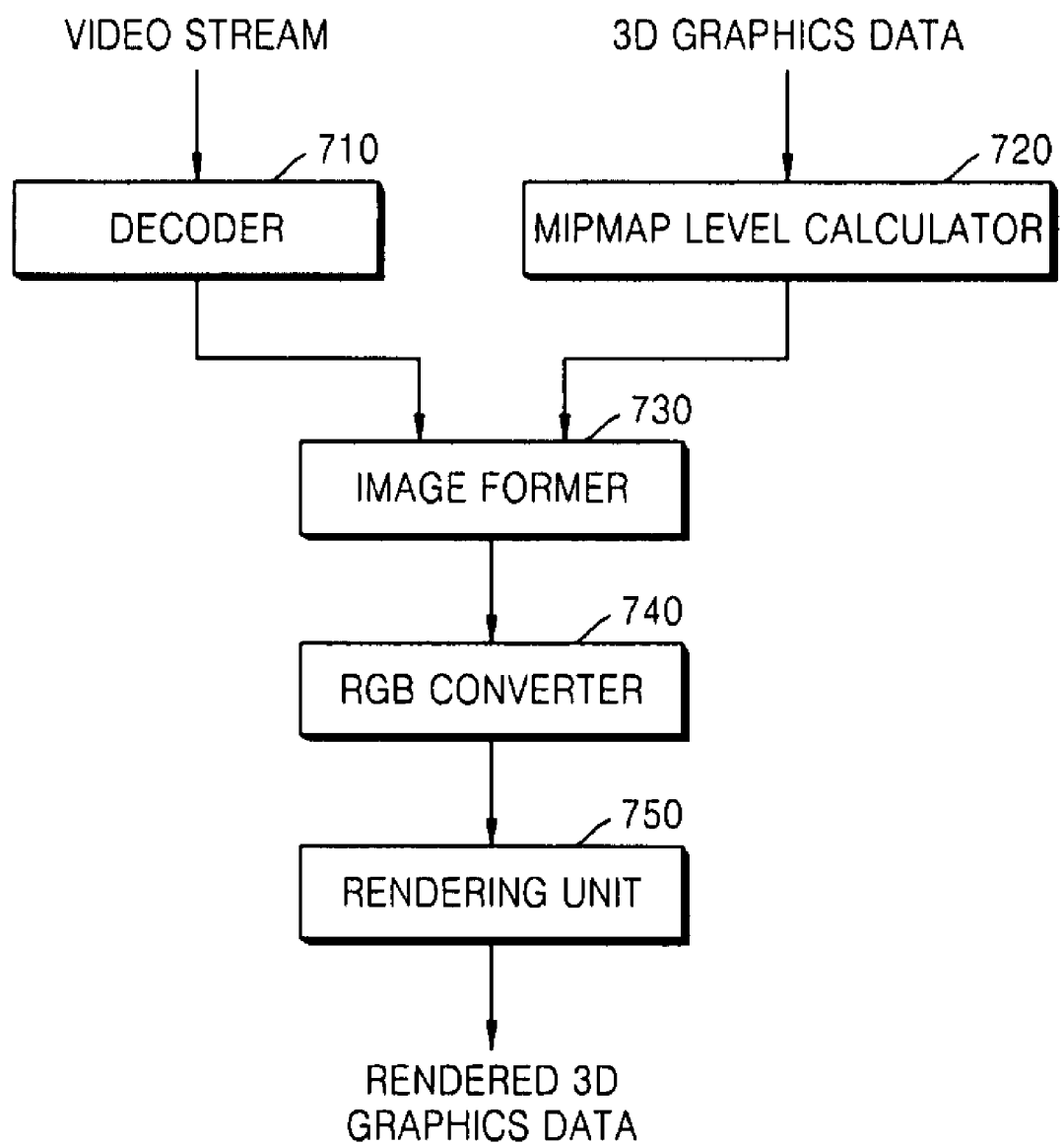
FIG. 7 is a block diagram of an apparatus for rendering 3D graphics data according to a fourth embodiment of the present invention.

FIG. 7 is a block diagram of an apparatus for rendering 3D graphics data according to a fourth embodiment of the present invention.

Referring to FIG. 7, the apparatus includes a decoder 710, a mipmap level calculator 720, an image former 730, an RGB converter 740, and a rendering unit 750.

The decoder 710 generates a video frame image having a single resolution from a video stream.

The mipmap level calculator 720 calculates a mipmap level corresponding to the size of a primitive, which is a basic constituent unit of objects indicated by 3D graphics data.

The image former 730 forms an image corresponding to the mipmap level calculated by the mipmap level calculator 720 from the video frame image generated by the decoder 710. The image former 730 can form the image by sampling pixels belonging to the video frame image generated by the decoder 710 based on the mipmap level.

The RGB converter 740 converts the image formed by the image former 730 to an RGB signal value.

The rendering unit 750 renders the primitive using the image converted by the RGB converter 140. In more detail, the rendering unit 750 prepares a mipmap closest to the size of the primitive, which is a basic constituent unit of objects indicated by 3D graphics data, and determines color information of each of pixels of the primitive by performing a kind of image interpolation for a portion having a size difference.

Figure 8:
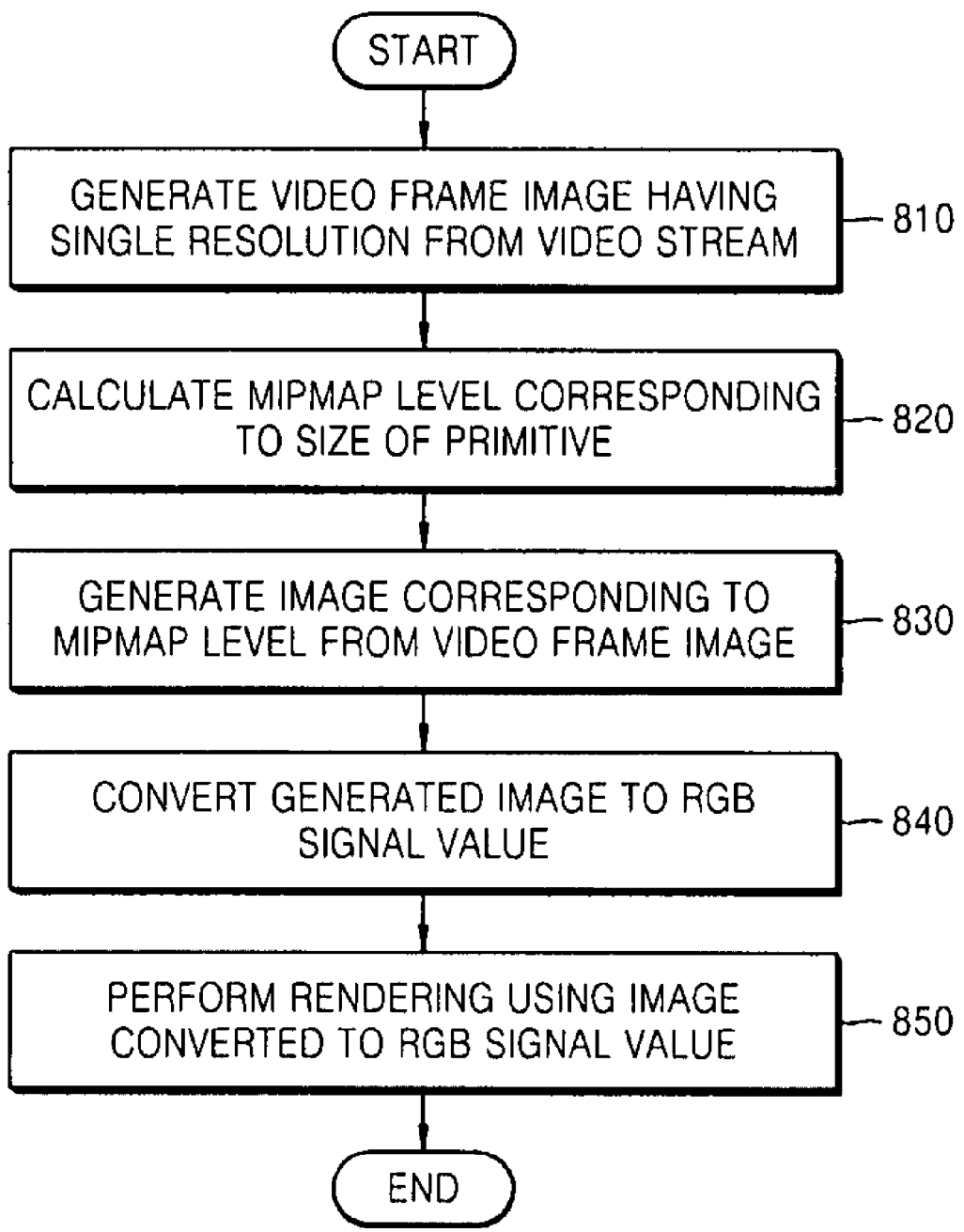
FIG. 8 is a flowchart of a method of rendering 3D graphics data according to the fourth embodiment of the present invention.

FIG. 8 is a flowchart of a method of rendering 3D graphics data according to the fourth embodiment of the present invention. Referring to FIG. 8, the method according to the fourth embodiment is comprised of operations sequentially processed in the apparatus illustrated in FIG. 7. The fourth embodiment corresponds to a case where a video decoder for outputting an image having only one resolution from a received video stream is used.

In operation 810, the apparatus for rendering 3D graphics data generates a video frame image having a single resolution from a video stream.

In operation 820, the apparatus for rendering 3D graphics data calculates a mipmap level corresponding to the size of a primitive, which is a basic constituent unit of objects indicated by 3D graphics data. The mipmap level can be calculated from an area of the primitive.

In operation 830, the apparatus for rendering 3D graphics data generates an image corresponding to the mipmap level calculated in operation 820 from the video frame image generated in operation 810.

In operation 840, the apparatus for rendering 3D graphics data converts the image generated in operation 830 to an RGB signal value.

In operation 850, the apparatus for rendering 3D graphics data renders the primitive using the image converted in operation 840. In more detail, the apparatus for rendering 3D graphics data prepares a mipmap closest to the size of the primitive, which is a basic constituent unit of objects indicated by 3D graphics data, and determines color information of each of pixels of the primitive by performing a kind of image interpolation for a portion having a size difference.

Figure 9:
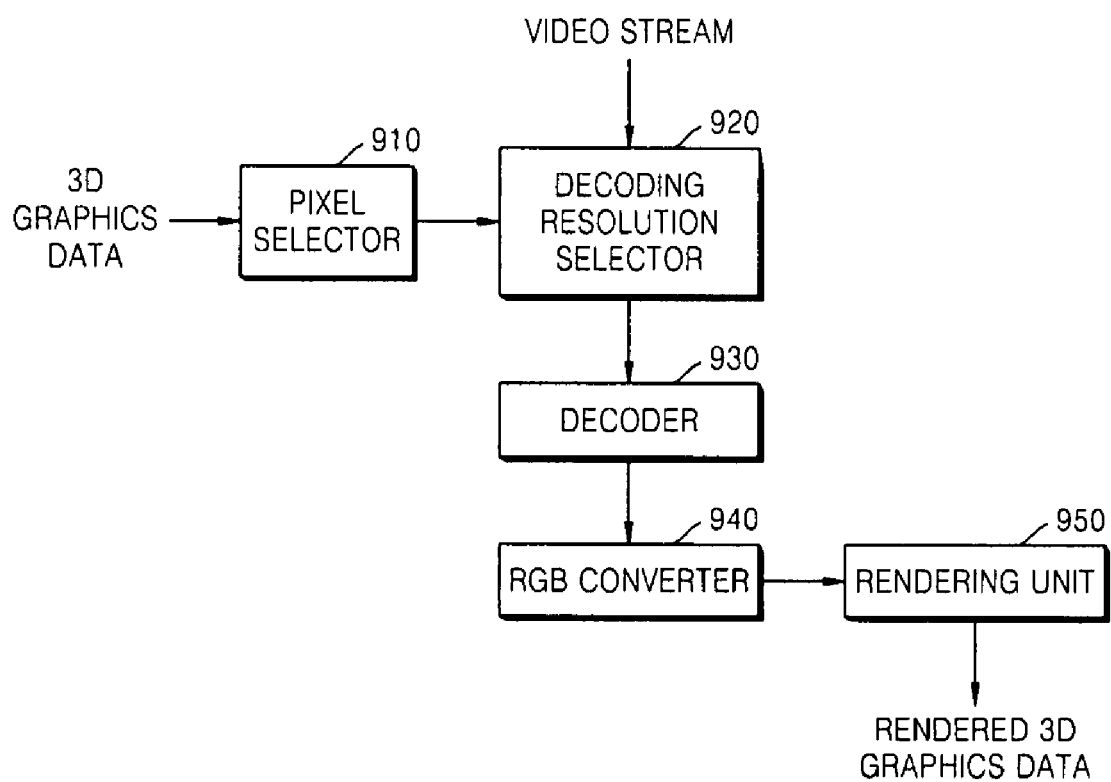
FIG. 9 is a block diagram of an apparatus for rendering 3D graphics data according to a fifth embodiment of the present invention.

FIG. 9 is a block diagram of an apparatus for rendering 3D graphics data according to a fifth embodiment of the present invention.

Referring to FIG. 9, the apparatus includes a pixel selector 910, a decoding resolution selector 920, a decoder 930, an RGB converter 940, and a rendering unit 950.

The pixel selector 910 selects a pixel having the highest depth value and a pixel having the lowest depth value from among pixels of a primitive, which is a basic constituent unit of objects indicated by 3D graphics data. Each depth value may be a Z value stored in a Z-buffer.

The decoding resolution selector 920 selects resolutions corresponding to the depth values of the pixels selected by the pixel selector 910 from among a plurality of resolutions supported by a video stream. While a depth value increases as a corresponding pixel is farther from a viewpoint, the decoding resolution selector 920 selects a lower resolution. Thus, the decoding resolution selector 920 selects a resolution corresponding to the highest depth value and a resolution corresponding to the lowest depth value from among the pixels of the primitive. While the first through third embodiments perform area-based selection or triangle-based mipmapping, the fifth embodiment performs per-pixel based selection or per-pixel mipmapping. Thus, in the fifth embodiment, relatively more resolutions are selected for rendering a certain primitive compared to the first through third embodiments.

The decoder 930 generates video frame images having the resolutions selected by the decoding resolution selector 920 and resolutions between the selected resolutions from the video stream.

The RGB converter 940 converts the video frame images generated by the decoder 930 to RGB signal values.

The rendering unit 950 renders the 3D graphics data using the video frame images received from the RGB converter 940.

Figure 10:
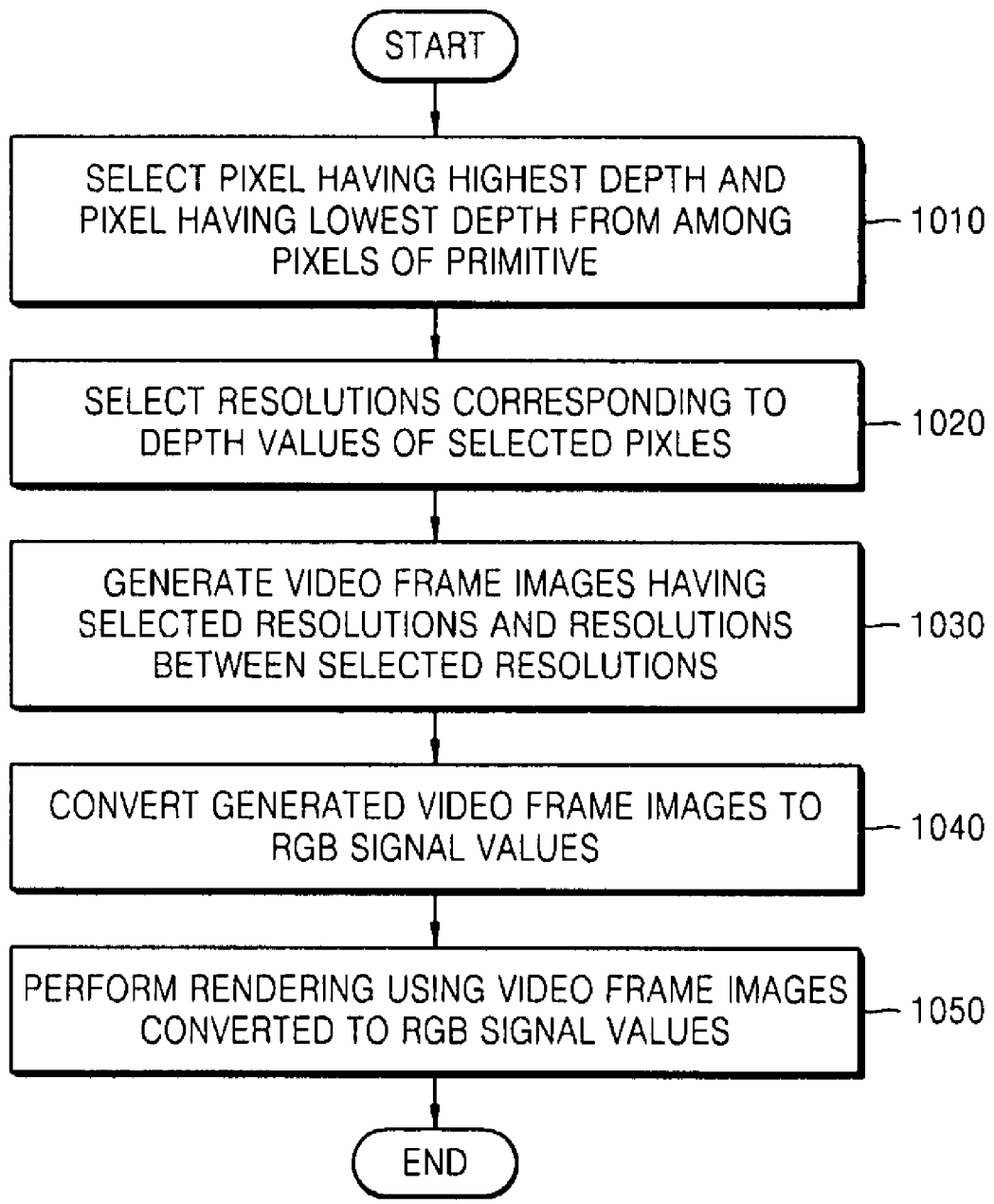
FIG. 10 is a flowchart of a method of rendering 3D graphics data according to the fifth embodiment of the present invention.

FIG. 10 is a flowchart of a method of rendering 3D graphics data according to the fifth embodiment of the present invention. The fifth embodiment corresponds to a case where a video decoder for outputting an image having several resolutions from a received video stream is used. Referring to FIG. 10, the method according to the fifth embodiment is comprised of operations sequentially processed in the apparatus illustrated in FIG. 9. Thus, even if there exists descriptions omitted hereinafter, the description of the apparatus illustrated in FIG. 9 is also applied to the method illustrated in FIG. 10.

In operation 1010, the apparatus for rendering 3D graphics data selects a pixel having the highest depth value and a pixel having the lowest depth value from among pixels of a primitive, which is a basic constituent unit of objects indicated by 3D graphics data.

In operation 1020, the apparatus for rendering 3D graphics data selects resolutions corresponding to the depth values of the pixels selected in operation 1010 from among a plurality of resolutions supported by a video stream.

In operation 1030, the apparatus for rendering 3D graphics data generates video frame images having the resolutions selected in operation 1020 and resolutions between the selected resolutions from the video stream.

In operation 1040, the apparatus for rendering 3D graphics data converts the video frame images generated in operation 1030 to RGB signal values.

In operation 1050, the apparatus for rendering 3D graphics data renders the 3D graphics data using the video frame images converted to the RGB signal values in operation 1040.

Figure 11:
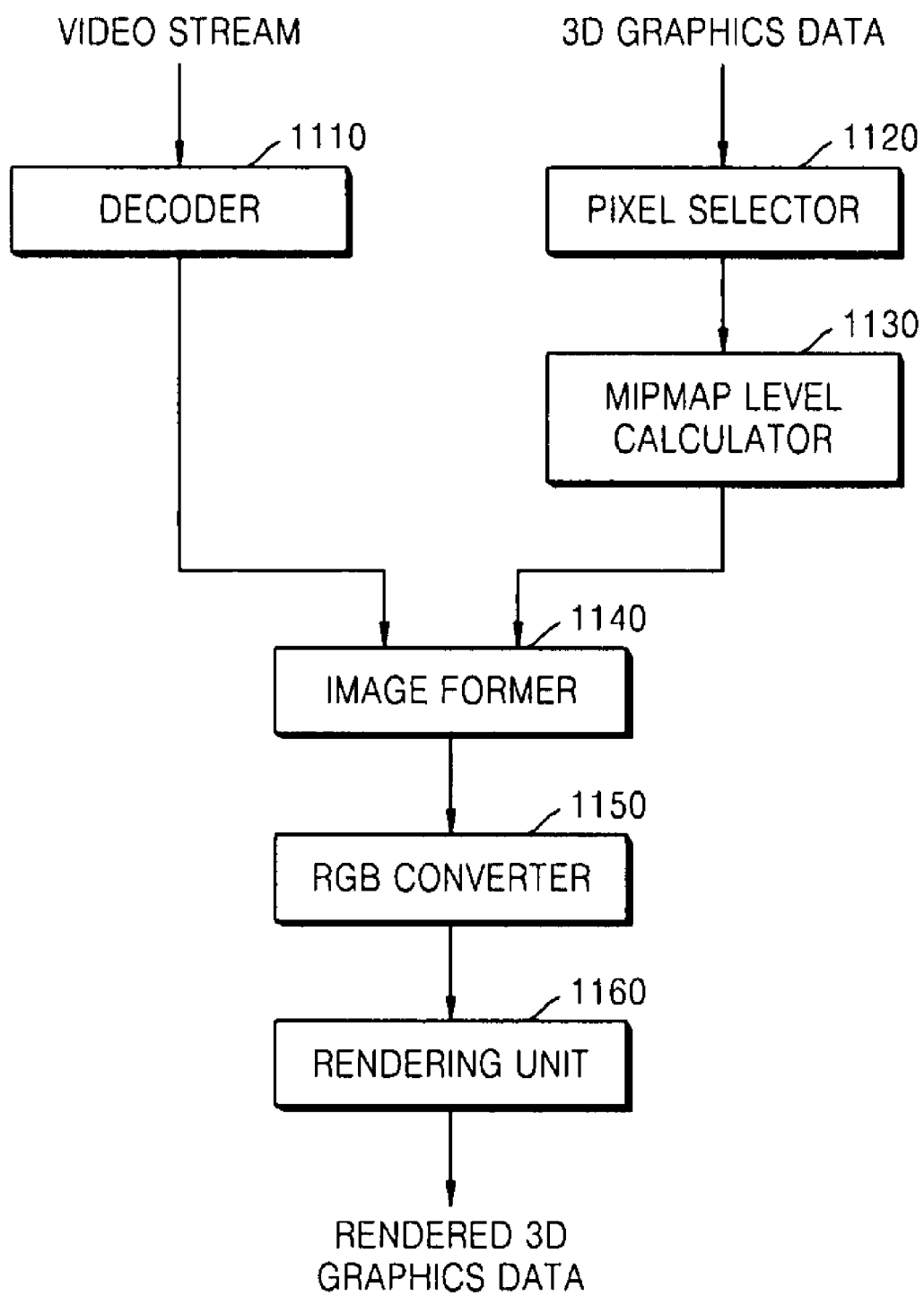
FIG. 11 is a block diagram of an apparatus for rendering 3D graphics data according to a sixth embodiment of the present invention.

FIG. 11 is a block diagram of an apparatus for rendering 3D graphics data according to a sixth embodiment of the present invention.

Referring to FIG. 11, the apparatus includes a decoder 1110, a pixel selector 1020, a mipmap level calculator 1130, an image former 1140, an RGB converter 1150, and a rendering unit 1160. The sixth embodiment corresponds to a case where a video decoder for outputting an image having only one resolution from a received video stream is used.

The decoder 1110 generates a video frame image having a single resolution from a video stream.

The pixel selector 1120 selects a pixel having the highest depth value and a pixel having the lowest depth value from among pixels of a primitive, which is a basic constituent unit of objects indicated by 3D graphics data. Each depth value may be a Z value stored in a Z-buffer.

The mipmap level calculator 1130 calculates mipmap levels corresponding to the depth values of the pixels selected by the pixel selector 1120. In more detail, a depth value increases as a corresponding pixel is farther from a viewpoint, and the mipmap level calculator 1130 calculates a mipmap level of a higher level. Thus, the mipmap level calculator 1130 calculates a mipmap level corresponding to the highest depth value and a mipmap level corresponding to the lowest depth value from among the pixels of the primitive. A first pixel having the highest depth value among the pixels of the primitive is farthest from the viewpoint, and a second pixel having the lowest depth value is the closest to the viewpoint. In this case, a mipmap level corresponding to the first pixel may be a level 3, and a mipmap level corresponding to the second pixel may be a level 0. While the fourth embodiment performs area-based selection or triangle-based mipmapping, the sixth embodiment performs per-pixel based selection or per-pixel mipmapping. Thus, in the sixth embodiment, relatively more mipmap levels are selected for rendering a certain primitive compared to the fourth embodiment.

The image former 1140 forms images corresponding to the mipmap levels calculated by the mipmap level calculator 1130 and mipmap levels between the calculated mipmap levels from the video frame image generated by the decoder 1110. For example, in case of the example explained in the mipmap level calculator 1130, the image former 1140 forms images corresponding to four mipmap levels between the level 0 and the level 3, i.e. from the level 0 to the level 3.

The RGB converter 1150 converts the images formed by the image former 1140 to RGB signal values.

The rendering unit 1160 renders the 3D graphics data using the images converted by the RGB converter 1150.

Figure 12:
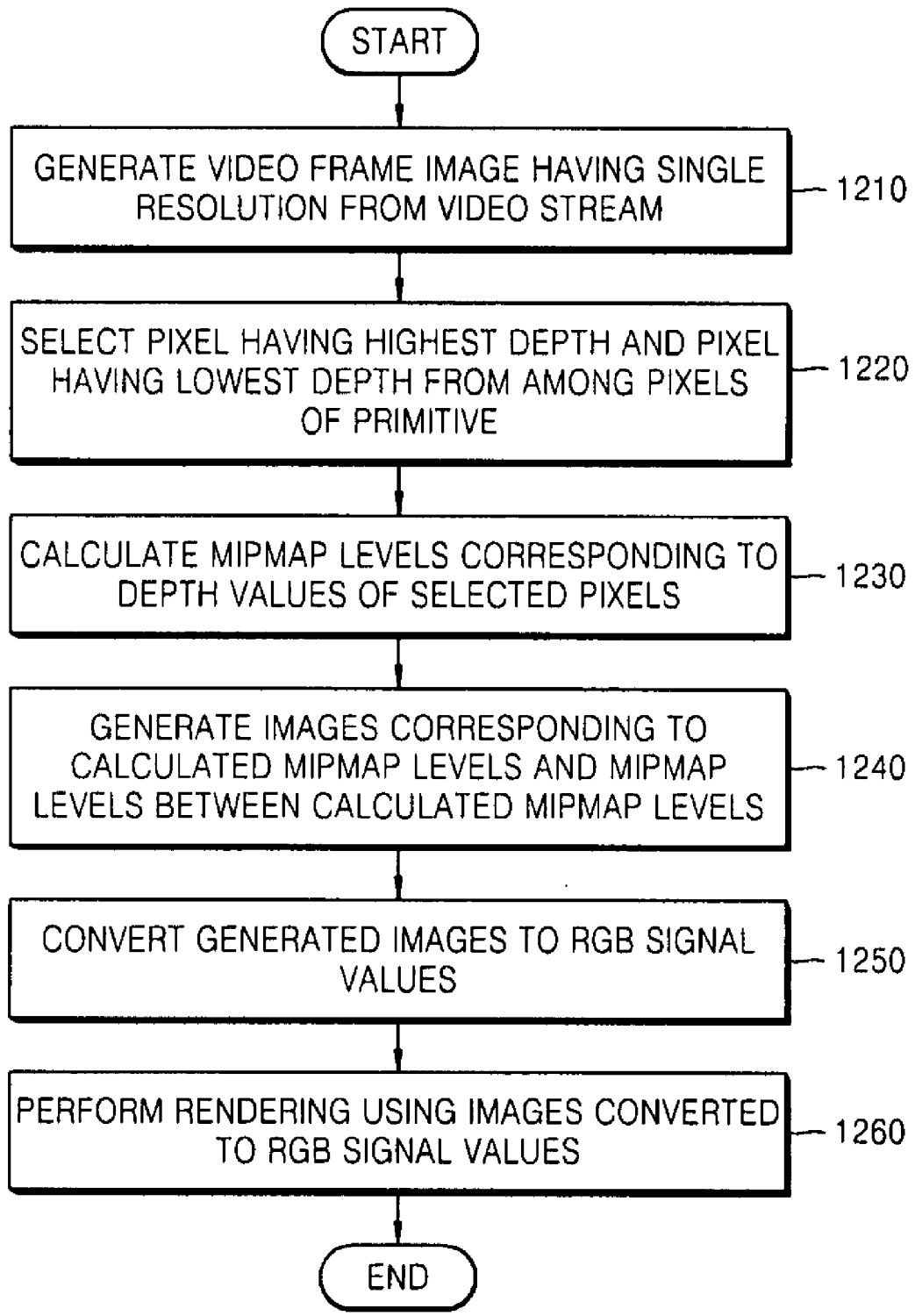
FIG. 12 is a flowchart of a method of rendering 3D graphics data according to the sixth embodiment of the present invention.

FIG. 12 is a flowchart of a method of rendering 3D graphics data according to the sixth embodiment of the present invention. Referring to FIG. 12, the method according to the sixth embodiment is comprised of operations sequentially processed in the apparatus illustrated in FIG. 11. The sixth embodiment corresponds to a case where a video decoder for outputting an image having only one resolution from a received video stream is used.

In operation 1210, the apparatus for rendering 3D graphics data generates a video frame image having a single resolution from a video stream.

In operation 1220, the apparatus for rendering 3D graphics data selects a pixel having the highest depth value and a pixel having the lowest depth value from among pixels of a primitive, which is a basic constituent unit of objects indicated by 3D graphics data.

In operation 1230, the apparatus for rendering 3D graphics data calculates mipmap levels corresponding to the depth values of the selected pixels.

In operation 1240, the apparatus for rendering 3D graphics data forms images corresponding to the calculated mipmap levels and mipmap levels between the calculated mipmap levels from the video frame image generated in operation 1210.

In operation 1250, the apparatus for rendering 3D graphics data converts the images formed in operation 1240 to RGB signal values.

In operation 1260, the apparatus for rendering 3D graphics data renders the 3D graphics data using the images converted to the RGB values in operation 1250.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, according to the present invention, when a video frame image is generated from a video stream, by decoding an image at a resolution corresponding to the size of a 3D graphics primitive and using the decoded image for rendering instead of decoding at the highest resolution, decoding can be performed at a resolution lower than the highest resolution in a case where an image at the highest resolution is unnecessary. As a result, the amount of memory space used is reduced, and power consumption is also reduced. In addition, since when rendering is performed using a video frame image decoded at a low resolution, a processing speed increases, and since rendering can be performed using video frame images decoded at various resolutions, image quality increases.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of rendering three dimensional (3D) graphics data, the method comprising:
   calculating a size of a primitive which is a basic constituent unit of objects indicated by the graphics data, on a screen;
   selecting one of a plurality of resolutions supported by a video stream according to the calculated size;
   generating a video frame image having the selected resolution from the video stream; and
   rendering the graphics data using the generated video frame image.

2. The method of claim 1, wherein the selecting of one of the plurality of resolutions comprises selecting a resolution corresponding to a video frame image having a size closest to the calculated size.

3. The method of claim 1, further comprising setting an operating voltage and an operating frequency for rendering the graphics data in proportion to the selected resolution,
   wherein the rendering of the graphics data comprises rendering the graphics data using the video frame image according to the set operating voltage and the set operating frequency.

4. The method of claim 1, wherein the rendering of the graphics data comprises determining color information of each of pixels of the graphics data using the video frame image.

5. The method of claim 1, wherein the calculating of the size of the primitive on the screen comprises when a plurality of primitives use the same image as a texture, calculating the maximum size from among sizes of the primitives on the screen and calculating mipmap levels corresponding to the sizes,
   the selecting of one of the plurality of resolutions comprises selecting one of the plurality of resolutions supported by the video stream according to the calculated maximum size; and
   the method further comprises generating images corresponding to the mipmap levels from the video frame image.

6. The method of claim 1, wherein the generating of the video frame image further comprises converting the generated video frame image to an RGB signal value, and
   the rendering of the graphics data comprises rendering the graphics data using the video frame image converted to the RGB signal value.

7. A method of rendering three dimensional (3D) graphics data, the method comprising:
   generating a video frame image having a single resolution from a video stream;
   calculating a mipmap level corresponding to a size of a primitive which is a basic constituent unit of objects indicated by the graphics data;
   generating an image corresponding to the mipmap level from the video frame image; and rendering the graphics data using the generated image.

8. The method of claim 7, wherein the rendering of the graphics data comprises determining color information of each of pixels of the graphics data using the image.

9. A method of rendering three dimensional (3D) graphics data, the method comprising:

selecting a pixel having a greatest depth value and a pixel having a least depth value from among pixels of a primitive, which is a basic constituent unit of objects indicated by the graphics data;

selecting resolutions corresponding to depth values of the selected pixels from among a plurality of resolutions supported by a video stream;

generating video frame images having the selected resolutions and resolutions between the selected resolutions from the video stream; and rendering the graphics data using the generated video frame images.

10. A method of rendering three dimensional (3D) graphics data, the method comprising:

generating a video frame image having a single resolution from a video stream;

selecting a pixel having a greatest depth value and a pixel having a least depth value from among pixels of a primitive which is a basic constituent unit of objects indicated by the graphics data;

calculating mipmap levels corresponding to depth values of the selected pixels;

forming images corresponding to the calculated mipmap levels and mipmap levels between the calculated mipmap levels from the video frame image; and rendering the graphics data using the generated images.

11. A non-transitory computer readable recording medium storing a computer readable program for executing the method of any one of claims 1, 7, 9, and 10.

* * * * *